Apr. 17, 1923. 1,451,757
B. R. BONNEY
STEERING MEANS FOR DRAWN VEHICLES
Filed Jan. 31, 1921 3 Sheets-Sheet 1
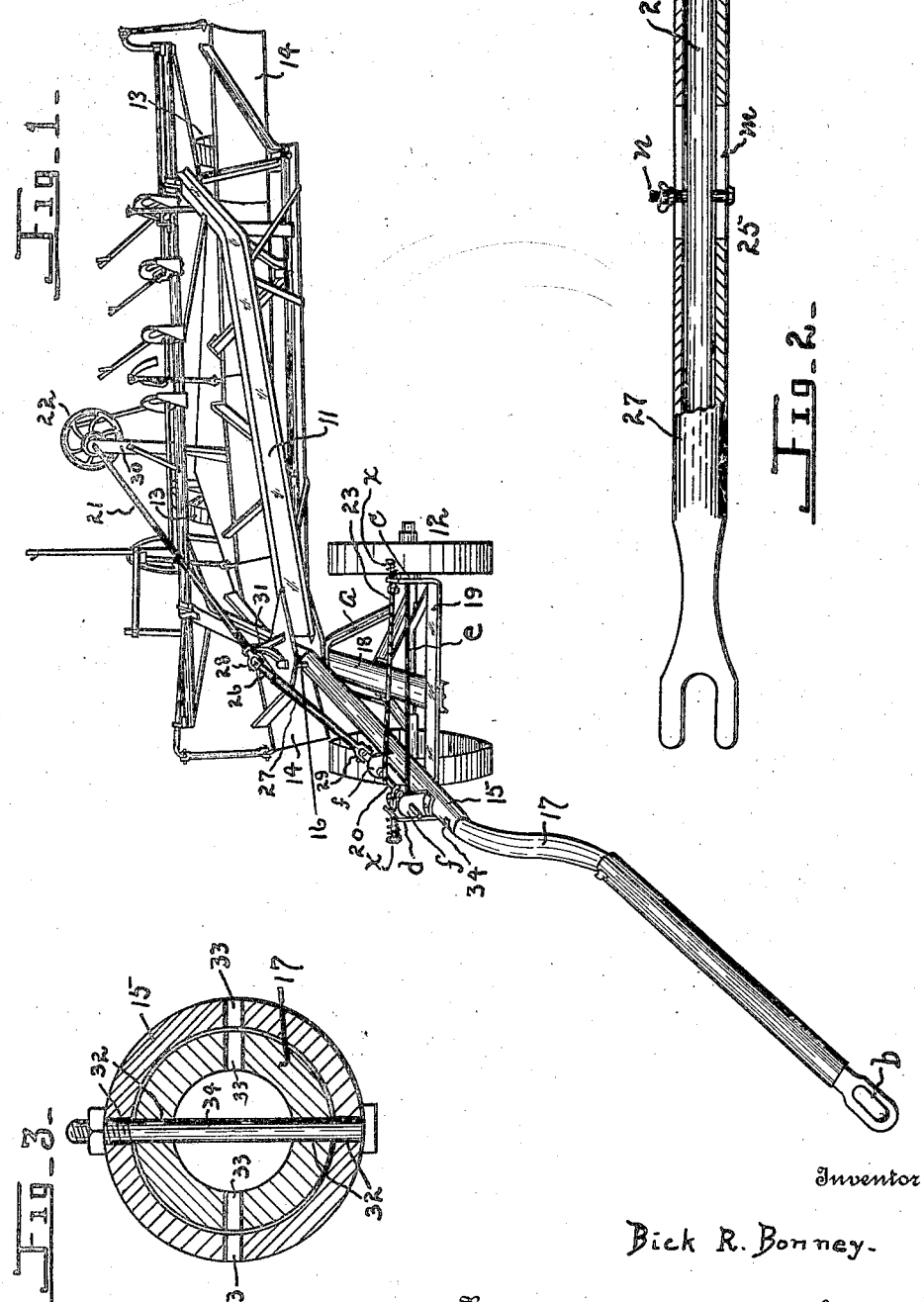
Inventor
Bick R. Bonney.
By
Hiram A. Sturges,
Attorney

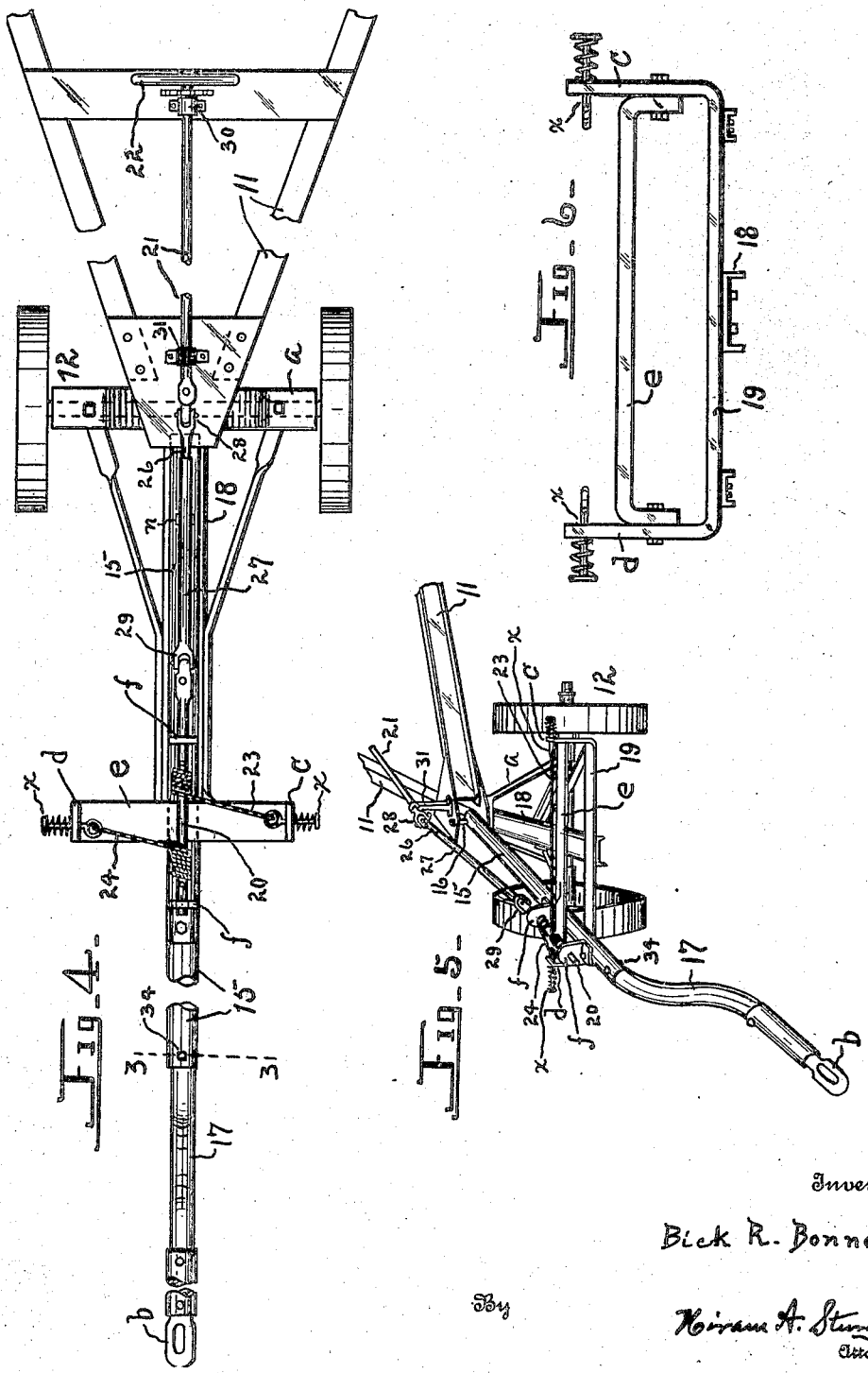

Apr. 17, 1923.  
B. R. BONNEY  
1,451,757  
STEERING MEANS FOR DRAWN VEHICLES  
Filed Jan. 31, 1921  3 Sheets-Sheet 3
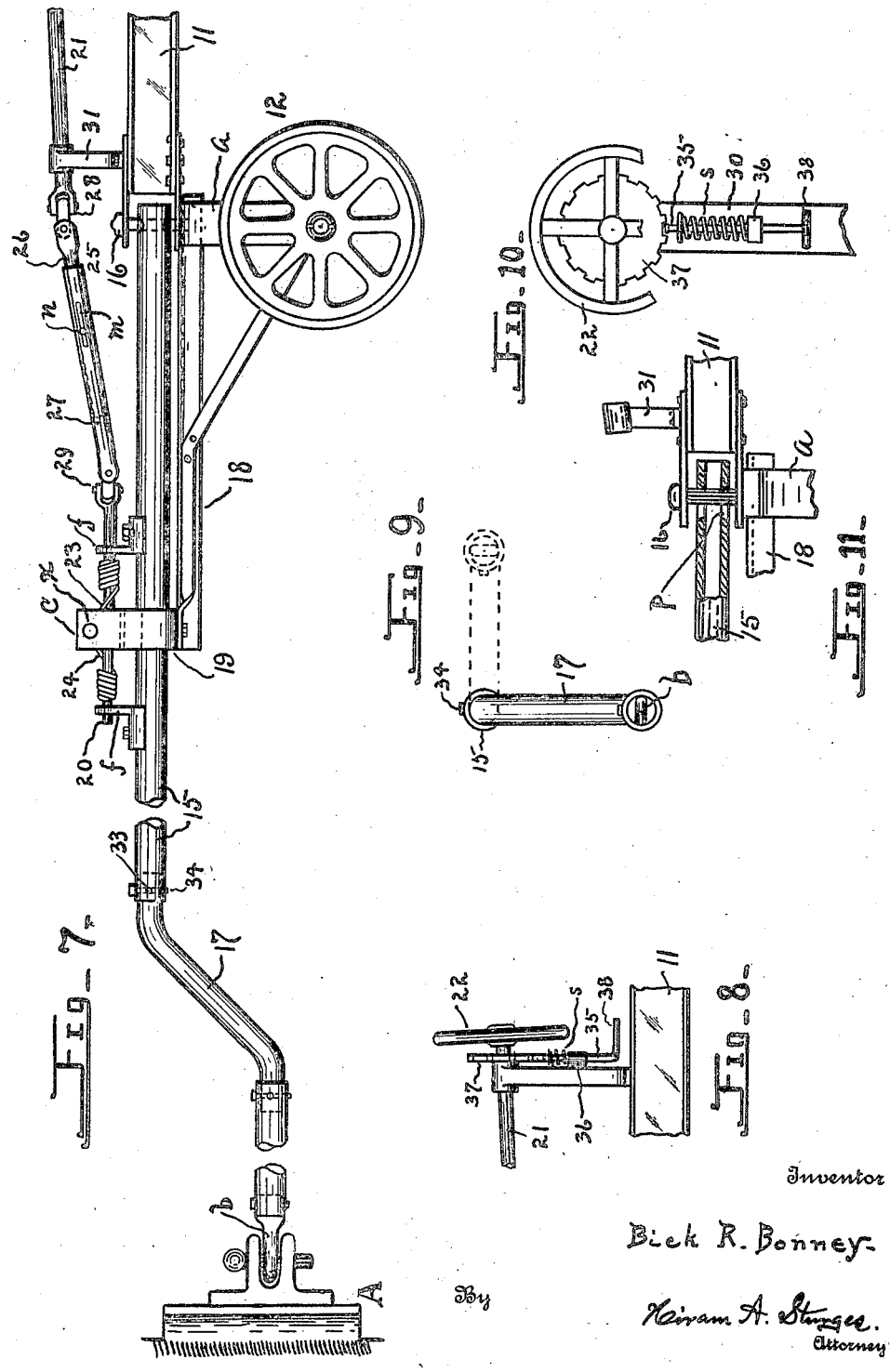
Inventor  
Bick R. Bonney  
By Hiram A. Sturges  
Attorney Patented Apr. 17, 1923.                                                    1,451,757

UNITED STATES PATENT OFFICE.

BICK R. BONNEY, OF OMAHA, NEBRASKA, ASSIGNOR TO STROUD AND COMPANY, OF OMAHA, NEBRASKA, A CORPORATION.

STEERING MEANS FOR DRAWN VEHICLES.

Application filed January 31, 1921. Serial No. 441,210.

*To all whom it may concern:*

Be it known that I, BICK R. BONNEY, a citizen of the United States, residing at Omaha, in the county of Douglas and State of Nebraska, have invented certain new and useful Improvements in Steering Means for Drawn Vehicles, of which the following is a specification.

This invention relates to mechanism useful in the control of the movements of road maintainers when drawn by tractors. While of advantage in the operation of steering road maintainers, it may, of course, be used in connection with vehicles generally which are drawn by tractors or other vehicles.

In the operation of forming road beds which have a curvature in cross-section, it is necessary to cause the road maintainer to move in such a manner that a scraper blade will form a depressed part or gutter at the side of a highway, and since the tractor in some instances, on account of soft or muddy ground or obstructions cannot be driven in line with the gutter, it has been found to be a great advantage to employ mechanism for use between the tractor and maintainer for steering the latter independently of the movements of the tractor.

The novel and useful features of the invention are fully described herein and are illustrated in the accompanying drawings, wherein, Fig. 1 is a perspective view of a drawn vehicle or road maintainer, showing the steering means. Fig. 2 is a broken away view showing the keyed connection of a telescoping rod-section. Fig. 3 is an enlarged detail, being a section on line 3—3 of Fig. 4. Fig. 4 is a plan view of the steering means, and Fig. 5 is a perspective view of the same. Fig. 6 is a front view of a yoke. Fig. 7 is a broken away side view of the steering mechanism. Fig. 8 is a detail showing a steering shaft and wheel and locking means therefor. Fig. 9 is a detail showing a front view of the curved tongue-extension or goose neck. Fig. 10 is a front view of the shaft locking means shown in Fig. 8. Fig. 11 shows a pivotal mounting for a tongue.

The invention is described in connection with a road maintainer having a frame 11 supported at its front end by a truck 12, its rear end being provided with wheels 13. Numerals 14 indicate scraper blades for the maintainer, these being disposed transversely of the frame; and it will be understood that the blades may be elevated or lowered by means of certain levers, said blades being for the purpose of engaging and moving the ground in forming road beds and maintaining a smooth surface for road beds while moving forwardly, a tractor or similar motive-power member A moving at the front, being generally used when drawing the maintainer for this purpose.

In order that the movements of the maintainer toward the "near" or "off" side may be practically independent of the forward movement of the tractor while connected therewith, certain mechanism is employed for this connection, consisting, in part, of a tongue 15, preferably of tubular construction, pivotally connected at its rear end with the front end of the frame and with the bolster $a$ of the truck, by means of a king-pin 16, the front end of the tongue being provided with a curved extension or goose-neck 17 having a terminal staple $b$ for a connection with a tractor or other motor vehicle.

The truck is provided with a forwardly projecting reach-bar 18 which provides a mounting on its front end for a yoke 19 which is disposed transversely thereof and which has arms $c$ and $d$ projecting upwardly, said yoke preferably being provided, parallel therewith and near its upper side, with a buffer-plate $e$.

The tongue 15 and reach-bar 18 are so proportioned as to length that the yoke 19 will be disposed approximately midway between the ends of the tongue when the parts are assembled, the tongue being disposed between the yoke and its buffer-plate $e$.

As thus described, when the maintainer is drawn forwardly by a tractor or other means applied to the front end of the tongue or staple $b$, the longitudinal axis of the maintainer will normally be disposed in line with the tongue, but, while moving forwardly, if a power is applied to the reach-bar sufficient to cause it to have a swinging movement transversely of the tongue, it is obvious that the direction of movement of the truck and maintainer may be changed.

In order that the movement of the truck to the right or left may be readily changed and will be under convenient control of an operator, I provide a spool 20 for the tongue, adapted to be rotated in either direction by a steering shaft 21 which is provided at its rear end with a hand wheel 22, the spool having bearings in a pair of brackets $f$ which are secured to the upper side of the tongue at opposed sides of the yoke, a pair of strands 23 and 24 being secured to the spool and having parts wound thereon in reverse directions and secured upon the resiliently mounted slide-bars $x$ which are provided for the arms $c$ and $d$ of the yoke; and it is obvious that the shaft 21 and spool 20 may be rotated in a manner to cause approximately uniform lengths of the strands 23 and 24 to become wound upon the spool for the purpose of disposing the reach-bar 18 parallel with the tongue 15, as shown in Fig. 4, this being the position of parts when it is desired that the road maintainer shall move in the line of movement of a tractor which may draw the maintainer. Also it is obvious that if the spool is rotated in a direction to cause additional winding of the strand 24 upon the spool, the reach-bar 18 will be swung to the right; also said bar 18 may be swung to the left by winding the strand 23 on the spool, for steering the maintainer to the left.

On account of the construction described it will be seen that an operator may control the movements of the maintainer, and may cause it to move near to the side of a roadway to form a ditch or gutter at times when the tractor, on account of soft ground or obstructions, must be moving at or near the middle of the roadway.

Since the steering shaft 21 is disposed inclinedly, and since the tongue may move transversely with reference to the frame 11, a telescoping rod-section 25 is provided for a connection of the steering shaft with the spool, said section consisting of parts 26 and 27, the part 27 being provided with slots $m$ in which the bolt or lug $n$ of part 26 may be disposed when the latter is slidably mounted in the part 27, said part 26 having a universal joint connection 28 with the steering shaft 21, and the part 27 having a universal joint connection 29 with the spool, the steering shaft having bearings in the standard 30 which is mounted on the rear part of the frame 11, and in the bracket 31 mounted upon the front part of said frame, the aperture $p$ (Fig. 11.) for receiving the king pin 16 being of a suitable diameter to permit a free-swinging movement of the tongue relative to the frame 11.

Since tractors are of different heights and may be provided with fastening devices which may be disposed at various heights from the ground and to which the staple $b$ is to be attached, means are provided for an adjustable connection of the goose neck with the tongue, the end portions of the tongue and goose neck being provided with pairs of opposed apertures 32 and opposed apertures 33 (Fig. 3.), said pairs of apertures being disposed at right angles with reference to each other, and it will be seen that by use of a bolt 34, the tongue-extension or goose neck 17 may be disposed in various positions, as shown by broken lines in Fig. 9, for the purpose of connecting the staple $b$ with a fastening device upon a tractor, the construction being such that adjustments may be made for connecting the mechanism with tractors of various heights, the goose-neck being partly rotated so that its apertures 32 or 33 may register with the apertures of the tongue, as may be required for receiving the bolt 34.

In the use of the herein described steering means, the operator uses the steering wheel when forming gutters and while moving on rough or muddy ground since it is often desirable to steer the road maintainer independently of the movement of the tractor. In instances however when it is desired to cause the road maintainer to be disposed with its longitudinal axis in line with the line of travel of the tractor, no attention of an operator for steering will be required after disposing the tongue parallel with the reach-bar as shown in Fig. 4, any rotatable movement of the shaft 21 being prevented by use of a locking means which consists of a pawl 35 which is slidably mounted in a bracket 36 carried by the standard 30, said pawl normally being pressed upwardly by a spring $s$ for engaging a toothed wheel or rack 37 carried by the steering shaft 21, the pawl being provided at its lower end with a foot-piece 38 for use in causing disengagement of the pawl with the rack 37.

The advantages in the use of the herein described mechanism will be appreciated, for the reason that tractors are now generally used for drawing road forming machines, but on account of the reasons stated, cannot be depended upon for a control of all of the movements of these machines. By use of the means now presented the utility of road-forming machines is greatly increased especially in the matter of forming ditches or gutters. Also the steering means described is of advantage when "turning about" at the end of a roadway, since it is practically independent, in the matter of controlling its movements, of the forward movements of a tractor.

It will be understood that chains or similar members may be employed and substituted for the strands 23 and 24, operation being practically the same as described; also changes in form, size, and proportion of parts, as well as minor details, may be made, as found to be of advantage, said changes to be within the scope of the invention as claimed. Also while the steering means has been described in connection with a road forming machine or maintainer, it may be applied to any vehicle which is to be drawn.

What I claim as my invention and desire to secure by Letters Patent is,—

1. In steering means for a vehicle to be drawn by a tractor, a truck connected with and having a reach extending forwardly thereof, a yoke stationary with the reach and having upwardly projecting arms, resiliently mounted slide-bars carried by said arms, a tubular tongue having apertures and connected with the vehicle, a revoluble spool having bearings on the tongue, strands connecting the spools with the slide-bars, and a tongue-extension having a curved part provided with apertures and adapted to be rotated in the tongue to dispose its apertures in register with selected apertures of the tongue to elevate or lower the outer end of said tongue-extension for a connection with the tractor, and a keeper for engaging in said apertures.

2. In steering means for a vehicle to be drawn by a motor vehicle, a truck connected with and having a reach extending forwardly thereof, a yoke stationary with the reach, a revoluble spool having bearings on the tongue, strands connecting the spool with the yoke, a curved tongue-extension adapted to be disposed with its inner end in engagement with the tongue and to be rotated to elevate or lower its outer end for a mounting on the motor vehicle, and means to secure the tongue-extension stationary with the tongue after it has been rotated.

In testimony whereof, I have affixed my signature in presence of two witnesses.

BICK R. BONNEY.

Witnesses:
 HIRAM A. STURGES,
 ARTHUR H. STURGES.